(12) United States Patent
Gaulke et al.

(10) Patent No.: US 10,472,519 B2
(45) Date of Patent: Nov. 12, 2019

(54) HYDROCARBON WAX COMPOSITION, METHOD FOR THE PRODUCTION THEREOF AND USE THEREOF AS ADDITIVE IN RUBBER

(71) Applicant: Sasol Wax GmbH, Hamburg (DE)

(72) Inventors: Arnd-Luder Gaulke, Hamburg (DE); Uwe Kurras, Handeloh (DE); Corinna Schwarzendahl, Hannover (DE)

(73) Assignee: Sasol Wax GmbH, Hamburg (DE)

( * ) Notice: Subject to any disclaimer, the term of this patent is extended or adjusted under 35 U.S.C. 154(b) by 70 days.

(21) Appl. No.: 15/750,640

(22) PCT Filed: Aug. 4, 2016

(86) PCT No.: PCT/EP2016/001345
§ 371 (c)(1),
(2) Date: Feb. 6, 2018

(87) PCT Pub. No.: WO2017/025180
PCT Pub. Date: Feb. 16, 2017

(65) Prior Publication Data
US 2018/0230307 A1    Aug. 16, 2018

(30) Foreign Application Priority Data
Aug. 7, 2015 (EP) .................................... 15180204

(51) Int. Cl.
| C08L 91/08 | (2006.01) |
| C08J 3/12 | (2006.01) |
| C08J 3/00 | (2006.01) |
| C08L 7/00 | (2006.01) |
| C08L 21/00 | (2006.01) |
| C08L 91/06 | (2006.01) |

(52) U.S. Cl.
CPC ............... *C08L 91/08* (2013.01); *C08J 3/005* (2013.01); *C08J 3/12* (2013.01); *C08L 7/00* (2013.01); *C08L 21/00* (2013.01); *C08L 91/06* (2013.01); *C08J 2391/08* (2013.01); *C08J 2491/08* (2013.01); *C08L 2205/025* (2013.01); *C08L 2205/18* (2013.01)

(58) Field of Classification Search
None
See application file for complete search history.

(56) References Cited

U.S. PATENT DOCUMENTS

| 3,826,735 | A |  | 7/1974 | Shinomura |  |
| 4,877,456 | A | * | 10/1989 | Chikamune | ............... C08K 5/01 |
|  |  |  |  |  | 106/270 |
| 5,296,129 | A | * | 3/1994 | Ikeda | ........................ C08L 7/00 |
|  |  |  |  |  | 106/270 |

FOREIGN PATENT DOCUMENTS

| EP | 2796494 | 10/2014 |
| JP | H11246706 | 9/1999 |
| JP | 2008095028 | 4/2008 |

* cited by examiner

*Primary Examiner* — Christopher M Rodd
(74) *Attorney, Agent, or Firm* — Bushman Werner, P.C.

(57) ABSTRACT

The invention relates to a hydrocarbon wax composition with superior properties as ozone- and aging-protecting additive in rubber products, the production thereof and the use thereof as ozone- and aging-protecting additive. The hydrocarbon wax composition is characterized by its distribution of hydrocarbon molecules by number of carbon atoms per hydrocarbon molecule and its distribution of branched and linear hydrocarbons.

16 Claims, 1 Drawing Sheet

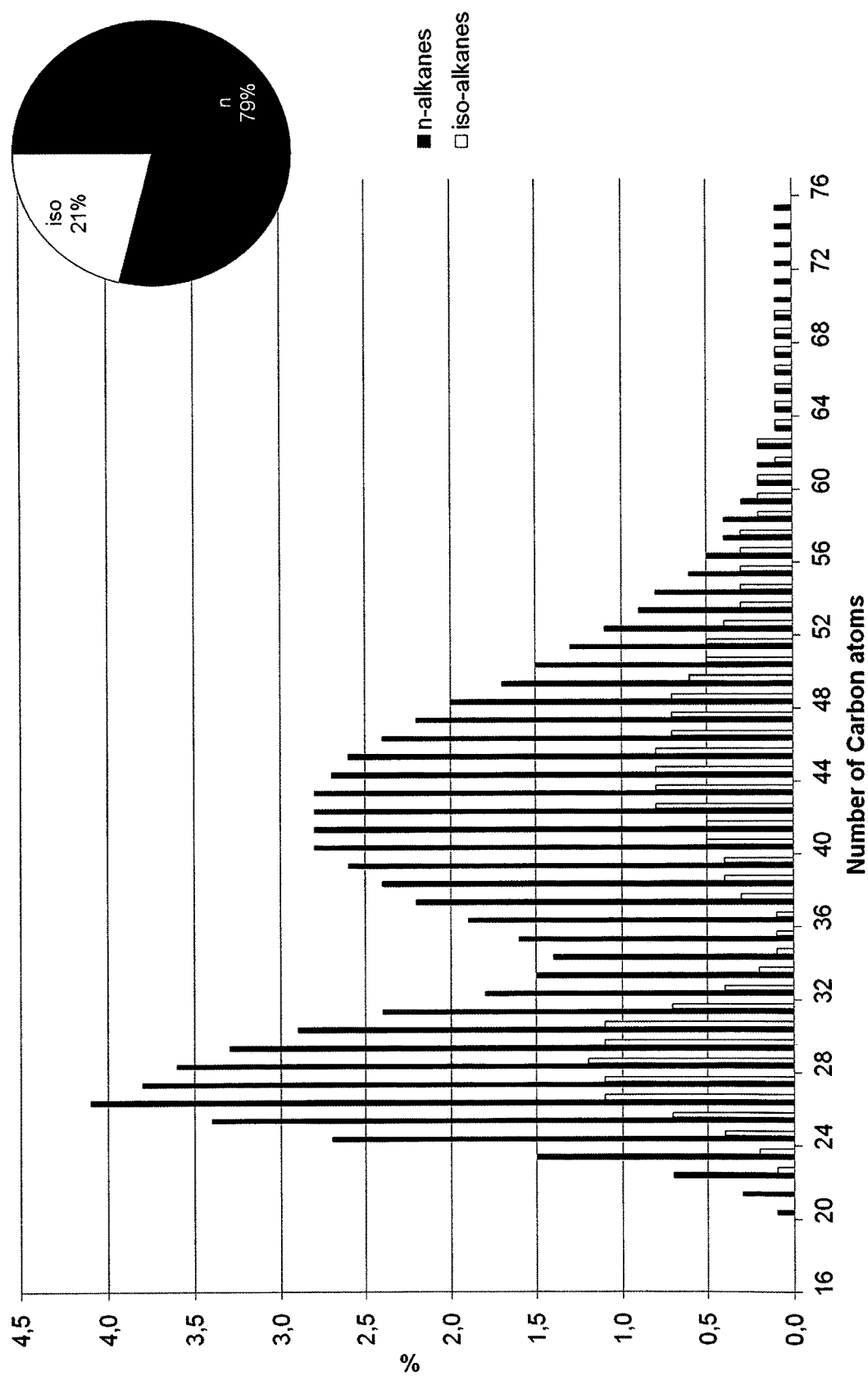

HYDROCARBON WAX COMPOSITION, METHOD FOR THE PRODUCTION THEREOF AND USE THEREOF AS ADDITIVE IN RUBBER

This application is a national phase application of PCT/EP2016/001345, filed Aug. 4, 2016, which claims priority to EP 15180204.8, filed Aug. 7, 2015, the disclosures of which are incorporated herein by reference for all purposes.

The invention relates to a hydrocarbon wax composition with superior properties as ozone- and aging-protecting additive in rubber products, the production thereof and the use thereof as ozone- and aging-protecting additive. The hydrocarbon wax composition is characterized by its distribution of hydrocarbon molecules by number of carbon atoms per hydrocarbon molecule and its distribution of branched and linear hydrocarbons.

DESCRIPTION OF THE PRIOR ART AND OBJECT OF THE INVENTION

The use of petroleum waxes in rubber and tyres for protecting elastomers containing double bonds from ozone attack is well known in rubber technology.

Waxes in general are typically defined as chemical compositions, which have a drop melting point above 40° C., are polishable under slight pressure, are kneadable or hard to brittle and transparent to opaque at 20° C., melt above 40° C. without decomposition, and typically melt between 50 and 90° C. with exceptional cases up to 200° C., form pastes or gels and are poor conductors of heat and electricity.

The mechanism of ozone protection of waxes in rubber and tyres has been described by several researchers, as well as the migration of wax to the surface of rubber products to form a protective film (Jon Menough, *Waxes' role in rubber*, Rubber World, February 1989; F. Jowett, *The protection of rubber from ozone attack by use of petroleum waxes*; C. B. Krishna, *Exposed surfaces necessary for wax to bloom*, Rubber&Plastic News, Aug. 26, 2002).

Ozone ($O_3$) attacks double bonds in rubber thereby adversely affecting physical properties of the rubber, embrittling the rubber, and causing cracking. In the relaxed state rubber absorbs ozone forming a protective surface layer of ozonides, but under static tension (as it applies for example to the sidewall of a parked car tyre) the ozone penetrates more deeply into the rubber causing severe cracking. The rate of ozone attack is reported to be a function of temperature and ozone concentration. Below −5° C. there is insufficient activation energy for an ozone attack, above that temperature the rate of attack increases up to about 50 to 55° C. at which temperature ozone begins to decompose into oxygen and the degradation from ozone stops.

Wax added to the rubber compound dissolves during processing (140-240° C.). As the rubber cools the wax forms a super-saturated solution in the rubber, thereby domains of the wax are formed. Upon cooling the resulting concentration gradient drives the wax to the surface. Due to differences in solubility and diffusion rate the hydrocarbon molecules of the wax migrate differently at a given temperature. Migration speed is a function of wax structure, chain length, rubber composition and temperature. Wax solubility increases with decreasing chain length and increasing temperature. Wax diffusion increases with decreasing chain length and increasing temperature. These conflicting dynamics result in the changes observed in the make-up of a wax film at a given temperature. Wax can also re-dissolve back into the rubber as the temperature increases. This causes the wax film to constantly change as ambient temperature changes. To be effective, the wax film must be present long lasting, uniform, unbroken, adherent and flexible.

The broader the temperature range of effective application, the greater the amount of wax that will be necessary to give adequate protection at any given temperature. But too high amounts of wax can have a negative impact on the physical properties of the rubber.

Additionally, it is desirable to minimize the visual crystallisation of the wax on the surface of the rubber (so called "blooming"). The blooming is seen as negative property which deteriorates the appearance of the tyre, especially the side walls.

It is a difficult task to provide a wax that fulfils the required needs. Many parameters play a crucial role in selecting the right wax amongst them are the number of carbon atoms, the n/iso-ratio and the crystallisation behaviour of the wax.

In the prior art a lot of different approaches to achieve above goal have been described.

WO 2012023026 A2 teaches an antiozonant wax comprising a paraffin wax containing a maximum of 45 wt.-% of linear paraffins to minimize the blooming of the wax at the surface and the resulting need to clean the tyres before offering for sale. The paraffin wax is petroleum-based and preferably comprises 40 to 60 wt. % of C15-C40 chains, of which at least 25 wt.-% are paraffins, and 40-60 wt.-% of C41 to C70 chains, of which at least 50 wt.-% comprise branched paraffins.

EP 0490533 B1 describes a paraffin wax composition which is a microcrystalline wax and a rubber composition containing 1 to 10 parts per weight of said wax. The patent teaches that if the total content of the linear saturated hydrocarbons is too high, the antioxidant contained in the blended rubber compositions blooms together with the blooming of the wax to change the appearance with sun light or UV-radiation, although the initial stage ozone resistance under stationary conditions is good.

EP 1876037 B1 claims a rubber composition for the sidewall of tyres comprising amongst others 1.5 parts by weight of paraffin wax relative to 100 parts of rubber with paraffin molecules having a number of carbon atoms from 20 to 50 while the ratio of iso-content to n-content is 5/95 to 20/80. The claimed paraffin wax is e.g. Ozoace 0355 from Nippon Seiro Co. Ltd.

JP S63-145346 A claims rubber compositions with improved ozone resistance due to the admixture of 0.5 to 10 parts per weight of rubber petroleum wax having two carbon count distribution peaks, wherein the Cmax of the low-molecular weight component region is C24-29 and the Cmax of the high-molecular weight component region is C32-38. The rubber compositions consequently show good ozone resistance at low and high temperatures. JP S63-145346 A is silent about the blooming properties.

U.S. Pat. No. 3,826,735 A claims ozone-protecting waxes (as exemplified in table 1 by prototypes K to O) having a distribution of the number of carbon atoms in the hydrocarbons, i.e. 14.2 to 57.8 wt.-% of linear hydrocarbons with a carbon number up to 29, 40.4 to 58.4 wt.-% of linear hydrocarbons with a carbon number of between 30 to 40 and 0 to 2.2 wt.-% of linear hydrocarbons with a carbon number of 41 and more.

EP 2796494 A1 discloses tyre inner-layer rubber compositions and pneumatic tyres made therefrom. The rubber compositions provide excellent ozone resistance and contain hydrocarbon waxes with 32 wt.-% or 81 wt.-% of linear hydrocarbons with 25 to 40 carbon atoms, 34 wt.-% or 6 wt.-% of linear hydrocarbons with 31 to 38 carbon atoms and 19 wt.-% or 0 wt.-% of linear hydrocarbons with 39 to 60 carbon atoms.

JPH 11246706 A teaches a rubber composition having excellent ozone resistance comprising a hydrocarbon wax comprising 7 to 30 wt.-% of linear and non-linear hydrocarbons with 20 to 25 carbon atoms, 15 to 35 wt.-% of linear hydrocarbons with 38 to 53 carbon atoms and non-linear hydrocarbons with 42 to 51 carbon atoms as well as 30 to 65 wt.-% of linear hydrocarbons with 28 to 36 carbon atoms and non-linear hydrocarbons of 29 to 39 carbon atoms.

JP 2008035028 A teaches a rubber composition for a tire which can improve the ozone resistance, wherein it contains a hydrocarbon wax comprising 20 to 30 wt. % of hydrocarbons with 25 to 30 carbon atoms and 10 to 25 wt.-% of hydrocarbons with 35 to 50 carbon atoms.

U.S. Pat. No. 4,877,456 discloses an antioxidant wax for rubber wherein the wax has a content of linear hydrocarbons of at least 75 wt.-%, a content of linear hydrocarbons with 21 to 26 carbon atoms of 5 to 25 wt.-% and a content of linear hydrocarbons with 36 to 51 carbon atoms of 20 to 45 wt.-%.

It is therefore amongst others an object of the present invention to provide a wax superior in protecting rubber-products from depletion by ozone wherein the wax shows a low blooming on the surface of the rubber products.

SUMMARY OF THE INVENTION

It was surprisingly found that a new hydrocarbon wax composition having a distinct distribution of aliphatic, acyclic hydrocarbons with respect to the number of carbon atoms and the branching, results in a superior ozone resistance and low blooming of the rubber products obtained thereof. The low blooming results in an improved optical appearance of the rubber product after a certain period in time, while maintaining the ozone resistance at a good level.

The hydrocarbon wax composition contains hydrocarbons of different chain length having in total a number of carbon atoms in the range of 15 to 110 and has a distribution of hydrocarbons by number of carbon atoms per hydrocarbon molecule as defined in claim 1, the sub-ordinate claims and herein below.

Hydrocarbons are molecules that exclusively consist of carbon and hydrogen atoms. If not otherwise mentioned n- or linear refers to a linear and aliphatic and i-, iso- or branched stands for branched and aliphatic.

The distribution of wax hydrocarbons by number of carbon atoms per hydrocarbon molecule and whether the molecule is branched or linear can be determined by Gas Chromatography (EWF Method 001/03 of the European Wax Federation).

Gas chromatography is a common type of chromatography used in analytical chemistry for separating and analyzing compounds that can be vaporized without decomposition. Typical uses of gas chromatography include testing the purity of a particular substance, or separating the different components of a mixture (the relative amounts of such components can also be determined). In the present situation, the gas chromatography-method stated above is suitable to identify the hydrocarbons according to the invention in all aspects mentioned in the claims.

The number of hydrocarbon molecules at a specified number of carbon atoms per hydrocarbon molecule is proportional to the absolute signal intensity (% peak area) of the GC-chromatogram at this number of carbon atoms per hydrocarbon molecule and can be obtained therefrom.

A hydrocarbon wax composition according to the invention comprises hydrocarbons having in between 15 to 110 carbon atoms, wherein 25 to 40% of the hydrocarbons are linear short chain length hydrocarbons having 20 to 30 carbon atoms;

5 to 18% of the hydrocarbons are linear medium chain length hydrocarbons having 31 to 38 carbon atoms;

25 to 40% of the hydrocarbons are linear long chain length hydrocarbons having 39 to 60 carbon atoms;

5 to 15% of the hydrocarbons are branched short chain length hydrocarbons having 21 to 31 carbon atoms;

below 5% of the hydrocarbons are branched medium chain length hydrocarbons having 32 to 39 carbon atoms; and 5 to 15% of the hydrocarbons are branched long chain length hydrocarbons having 40 to 61 carbon atoms;

wherein the percentage in each case is relative to the total number of hydrocarbons having 15 to 110 carbon atoms. The hydrocarbons addressed above with "the hydrocarbons" are only hydrocarbons with 15 to 110 carbon atoms.

The term "linear short chain length hydrocarbons" stands throughout this document for linear hydrocarbons having a total of 20 to 30 carbon atoms.

The term "linear medium chain length hydrocarbons" stands throughout this document for linear hydrocarbons having 31 to 38 carbon atoms.

The term "linear long chain length hydrocarbons" stands throughout this document for linear hydrocarbons having 39 to 60 carbon atoms.

The term "branched short chain length hydrocarbons" stands throughout this document for branched hydrocarbons having 21 to 31 carbon atoms.

The term "branched medium chain length hydrocarbons" stands throughout this document for branched hydrocarbons having 32 to 39 carbon atoms.

The term "branched long chain length hydrocarbons" stands throughout this document for branched hydrocarbons having 40 to 61 carbon atoms.

Such a hydrocarbon wax composition shows good ozone-protection and low blooming of rubber products produced with it. The low blooming results in an improved optical appearance of the rubber product also after a certain period, while maintaining the ozone resistance at a good level. Furthermore, other properties of the rubber product such as tensile strength, hardness and rebound resilience are not negatively influenced.

BRIEF DESCRIPTION OF THE DRAWINGS

FIG. 1 is a gas chromatogram showing the molecular distribution of carbon atoms per hydrocarbon molecule and the linear/branched ratio for Sasolwax Blend 7.

DETAILED DESCRIPTION OF THE INVENTION

The hydrocarbon wax composition is according to preferred embodiments further defined independently from each other—in any combination with respect to the hydrocarbon molecules with 15 to 110 carbon atoms defined above—as follows.

Preferably 26 to 37% of the hydrocarbons of the hydrocarbon wax composition are linear short chain length hydrocarbons having 20 to 30 carbon atoms.

Furthermore 26 to 37% of the hydrocarbons of the hydrocarbon wax composition preferably are linear long chain length hydrocarbons having 39 to 60 carbon atoms.

6 to 8% of the hydrocarbons of the hydrocarbon wax composition may preferably be branched short chain length hydrocarbons having 21 to 31 carbon atoms.

6 to 12% of the hydrocarbons of the hydrocarbon wax composition may preferably be branched long chain length hydrocarbons having 40 to 61 carbon atoms.

10 to 16% of the hydrocarbons of the hydrocarbon wax may preferably be linear medium chain length hydrocarbons having 31 to 38 carbon atoms.

0.1 to 3.0% of the hydrocarbons of the hydrocarbon wax may preferably be branched medium chain length hydrocarbons having 32 to 39 carbon atoms.

The hydrocarbon wax composition according to the invention is preferably further characterised by one or more of the following definitions
- the number ratio of linear short chain length hydrocarbons to the linear long chained hydrocarbons is between 0.5 and 1.5, more preferably between 0.6 and 1.2;
- the number ratio of branched short chain length hydrocarbons to the branched long chain length hydrocarbons is between 0.5 and 1.5, more preferably between 0.6 and 1.2;
- the number ratio of linear short chain length hydrocarbons to linear medium chain length hydrocarbons is between 1.5 and 3.5, more preferably between 1.6 and 3.2;
- the number ratio of linear long chain length hydrocarbons to linear medium chain length hydrocarbons is between 2.0 and 4.0, more preferably between 2.2 and 3.2;
- the number ratio of branched short chain length hydrocarbons to branched medium chain length hydrocarbons is between 2.5 and 6.5, more preferably between 2.8 and 6.0;
- the number ratio of branched long chain length hydrocarbons to branched medium chain length hydrocarbons is between 4.0 and 7.0, more preferably between 4.5 and 6.5;
- the number ratio of linear short chain length hydrocarbons to branched short chain hydrocarbons is between 3.0 and 6.0, more preferably between 3.5 and 5.5;
- the number ratio of linear long chain length hydrocarbons to branched long chain length hydrocarbons is between 3.0 and 6.0, more preferably between 3.2 and 5.0;
- the number ratio of linear medium chain length hydrocarbons to branched medium chain length hydrocarbons is between 6.0 and 12.0, more preferably between 6.4 and 11.2.

Furthermore 10 to 30%, preferably 15 to 25% of the hydrocarbons of the hydrocarbon wax composition are preferably branched hydrocarbons.

A hydrocarbon wax composition as defined above and in the claims shows improved blooming properties (see examples). It is assumed that this is due to the specific distribution of hydrocarbon molecules by number of carbon atoms per hydrocarbon molecule and its migration and ozone protection properties while not wishing to be bound by a particular theory.

The invention also includes a method for obtaining wax pastilles or a wax powder consisting of the hydrocarbon wax composition according to the invention by selectively blending and/or mixing different hydrocarbon wax components to obtain the desired properties.

This method for obtaining wax pastilles or a wax powder comprises the following steps:
Providing at least two hydrocarbon wax components, wherein
- a first hydrocarbon wax component comprises hydrocarbons with 15 to 110 carbon atoms, wherein above 60% of the hydrocarbons are linear short chain length hydrocarbons having 20 to 30 carbon atoms; and
- a second hydrocarbon wax component comprises hydrocarbons with 15 to 110 carbon atoms, wherein above 45% or according to a further embodiment above 60% of the hydrocarbons are linear long chain length hydrocarbons having 39 to 60 carbon atoms;
mixing the hydrocarbon wax components in a molten state with each other to obtain the hydrocarbon wax composition according to any of the preceding claims; and
solidifying the hydrocarbon wax composition, preferably by spray cooling or pastillation or slabbing.

Also claimed is the use of the hydrocarbon wax composition or the use of the wax pastilles or the wax powder as an additive in a rubber product. In a preferred use such additive reduces blooming of hydrocarbon wax molecules on the surface of the rubber product, protects the rubber product against ozone depletion and/or against ageing.

The rubber product preferably comprises 0.5 to 10 phr, more preferably 1 to 5 phr, and most preferably 1 to 3 phr of the hydrocarbon wax composition. The unit (parts per hundred parts of rubber by weight) is a unit used in the rubber industry and provides a measure relative to 100 parts per weight of the total mass of rubber present.

The invention may additionally or alternatively be described as follows:

A hydrocarbon wax composition comprising linear and branched hydrocarbon molecules, having a distribution of hydrocarbon molecules by number of carbon atoms per hydrocarbon molecule and having at least two maxima between 15 to 110 carbon atoms per hydrocarbon molecule, wherein in each case the maximum is the highest number of hydrocarbon molecules within a range of +/− two carbon atom per hydrocarbon molecule, wherein
- at least one maximum of the linear hydrocarbon molecules is between 23 to 33 carbon atoms per hydrocarbon molecule and at least one maximum of the linear hydrocarbon molecules is between 37 to 48 carbon atoms per hydrocarbon molecule;
- at least one maximum of the branched hydrocarbon molecules is between 23 to 33 carbon atoms per hydrocarbon molecule and at least one maximum of the branched hydrocarbon molecules is between 37 to 48 carbon atoms per hydrocarbon molecule;
- the maximum with the highest number of carbon atoms per hydrocarbon molecule in the range between 23 to 33 carbon atoms per hydrocarbon molecule and the maximum with the lowest number of carbon atoms per hydrocarbon molecule in the range between 37 to 48 carbon atoms per hydrocarbon molecule of linear and branched hydrocarbon molecules differ from each other by at least by 12 carbon atoms per hydrocarbon molecule;
- the distribution has no maximum for both, the linear and the branched hydrocarbon molecules, in the above range of the at least 12 carbon atoms per hydrocarbon molecule; and
- the distribution has at least one minimum for both, the linear and the branched hydrocarbon molecules, each at 30 to 36 carbon atoms per hydrocarbon molecule, wherein in each case the minimum is the lowest number of hydrocarbon molecules within a range of +/− two carbon atom per hydrocarbon molecule.

The hydrocarbon wax composition according to the additional or alternative definition preferably has at least one maximum of the distribution for the linear hydrocarbon molecules at 23 to 30 carbon atoms, more preferably at 24 to 29 carbon atoms per hydrocarbon molecule.

The hydrocarbon wax composition according to the additional or alternative definition preferably further has at least one maximum of the distribution for the linear hydrocarbon molecules at 39 to 48 carbon atoms, more preferably at 40 to 43 carbon atoms per hydrocarbon molecule.

Preferably the number of the branched hydrocarbons in the hydrocarbon wax composition according to the additional or alternative definition is between 10 and 30%, more preferably between 15 and 25% of the total number of hydrocarbon molecules.

EXAMPLES

Three hydrocarbon wax compositions:
Varazon 6500 (comparative example, from Sasol Wax GmbH, Hamburg, to obtain composition 1),
Vararzon 6066 (comparative example, from Sasol Wax GmbH, Hamburg, to obtain composition 2) and
Sasolwax Blend 7 (example according to the invention, from Sasol Wax GmbH, Hamburg, to obtain composition 3)
were incorporated into a "standard tyre" rubber composition according to table 1.

TABLE 1

| Components | Unit | Composition 1 | Composition 2 | Composition 3 |
| --- | --- | --- | --- | --- |
| Natural rubber TSR | phr | 40 | 40 | 40 |
| Polyisoprene, synthetic | phr | 10 | 10 | 10 |
| Butadiene rubber [a] | phr | 20 | 20 | 20 |
| SBR [b] | phr | 30 | 30 | 30 |
| Carbon black N339 | phr | 33 | 33 | 33 |
| Antiageing agent | phr | 5 | 5 | 5 |
| Further additives [c] | phr | 14.5 | 14.5 | 14.5 |
| Wax | phr | 2.3 | 1.5 | 2.3 |
| Sulfur and sulfenamide accelerator | phr | 3.3 | 3.3 | 3.3 | used rubber compositions
[a] Butadiene rubber, Nd-catalysed, high-cis BR
[b] Styrole-Butadiene-rubber, solvent-polymerised, SBR1500
[c] i.a. zinc oxide, stearic acid, plasticizer The production of the rubber composition mixture was conducted in a tangential mixer under standard conditions and in two stages. Test blocks were produced by vulcanisation from all mixtures and the typical material properties used in the rubber industry were determined. The following test methods were used for that purpose:
Shore-A-hardness (Unit Shore A, abbreviated ShA) at room temperature (RT) according to DIN 53 505
Rebound resilience (abbreviated rebound) at room temperature according to DIN 53 512
Tensile strength at room temperature according to DIN 53 504
Blooming behaviour: Vulcanisates have been stored for three months, protected from humidity and solar irradiation, and visually evaluated afterwards. Class 1: satisfying optical appearance, Class 2: sufficient optical appearance, Class 3: insufficient optical appearance
Ozone resistance at room temperature according to conditions similar to DIN 53 509/DIN ISO 1431-1: Ozone concentration 200 pphm+/−30 pphm, temperature 25° C.+/−3° C., 60%+/−5% air humidity and a static strain between 10 and 60%, whereas the evaluation is done according to DIN 53 509/DIN ISO 1431-1, Evaluation: positive (no cracks) or negative (cracks)

The properties of the rubber compositions containing the waxes can be seen in table 2:

TABLE 2

Properties of the rubber compositions

| Properties | Unit | Composition 1 (comparative) | Composition 2 (comparative) | Composition 3 (inventive) |
| --- | --- | --- | --- | --- |
| Tensile strength at RT | MPa | 13.1 | 13.1 | 12.6 |
| Rebound resilience at RT | % | 49 | 49 | 49 |
| Shore Hardness at RT | Shore A | 51 | 51 | 51 |
| Blooming behaviour | Class | 2 | 3 | 1 |
| Ozone resistance | | positive | positive | positive |

The hydrocarbon wax composition of Sasolwax Blend 7 was measured by gas chromatography according to the Standard Test Method for Analysis of Hydrocarbon Waxes by Gas Chromatography (EWF Method 001/03) of the European Wax Federation (see table 3).

TABLE 3

| Conditions of GC-measurements according to EWF Method 001/03 | |
| --- | --- |
| Sample concentration | 20 mg/20 ml solvent |
| Carrier gas | Hydrogen; 71 cm/sec |
| Column temperature | Start 75° C.; 25° C./min to 100° C.; 8° C./min to 325° C.; 325° C. for 15 min |
| Column dimensions | 25 m; 0.32 μm i.d.; 0.12 μm film thickness |
| Injector type | Cool on column |
| Result report | Area % |

The gas chromatogram is depicted in FIG. 1 and gives the molecular distribution of the number of carbon atoms per hydrocarbon molecule and the n/iso-ratio for Sasolwax Blend 7.

The Sasolwax Blend 7 was obtained by mixing 45 wt.-% of a fully refined paraffin wax with a congealing point according to ASTM D 938 of 52 to 54° C. and 81.3% of linear short chain length hydrocarbons having 20 to 30 carbon atoms (Sasolwax 5203), 45 wt.-% of a Fischer-Tropsch derived paraffin wax with a congealing point of 83° C. and 48.5% of linear long chain length hydrocarbons having 39 to 60 carbon atoms (Sasolwax C80) and 10 wt.-% of a hydrotreated microcrystalline wax with a congealing point of 78° C. and 74.5% of branched hydrocarbons (Sasolwax 3279).

In the hydrocarbon wax composition (Sasolwax Blend 7) according to the invention comprising hydrocarbons with 15 to 110 carbon atoms 26.4% of the hydrocarbons are linear short chain length hydrocarbons having 20 to 30 carbon atoms and 35.4% of the hydrocarbons are linear long chain length hydrocarbons having 39 to 60 carbon atoms.

Furthermore 7.0% of the hydrocarbons of this hydrocarbon wax composition are branched short chain length hydrocarbons having 21 to 31 carbon atoms and and 10.8% of the hydrocarbons are branched long chain length hydrocarbons having 40 to 61 carbon atoms.

15.2% of the hydrocarbons of this hydrocarbon wax composition are linear medium chain length hydrocarbons having 31 to 38 carbon atoms and 2.3% of the hydrocarbons are branched medium chain length hydrocarbons having 32 to 39 carbon atoms.

21% of the hydrocarbons of this hydrocarbon wax composition are branched hydrocarbons.

Table 4 shows the distribution of the different hydrocarbon wax compositions used in the experiments as defined in claim 1 also determined by the above GC-method.

TABLE 4

Hydrocarbon distribution of the different hydrocarbon wax compositions

| Feature | % hydrocarbons according to Claim 1 | Varazon 6500 comparative | Varazon 6066 comparative | Sasolwax Blend 7 inventive |
|---|---|---|---|---|
| $C_{20-30}$ (linear) | 25 to 40% | 29.0 | 41.4 | 26.4 |
| $C_{39-60}$ (linear) | 25 to 40% | 15.2 | 3.4 | 35.4 |
| $C_{21-31}$ (branched) | 5 to 15% | 2.2 | 8.7 | 7.0 |
| $C_{40-61}$ (branched) | 5 to 15% | 10.1 | 7.0 | 10.8 |
| $C_{31-38}$ (linear) | 5 to 18% | 35.4 | 22.2 | 15.2 |
| $C_{32-39}$ (branched) | below 5% | 7.3 | 17.3 | 2.3 |

As it can be seen from the above results the hydrocarbon wax composition according to the invention shows reduced blooming in rubber compositions produced therewith whilst maintaining the other properties such as ozone resistance, tensile strength, hardness and rebound resilience.

The invention claimed is:

1. A hydrocarbon wax composition comprising hydrocarbons with 15 to 110 carbon atoms, wherein
   25 to 40% of the hydrocarbons are linear short chain length hydrocarbons having 20 to 30 carbon atoms;
   5 to 18% of the hydrocarbons are linear medium chain length hydrocarbons having 31 to 38 carbon atoms;
   25 to 40% of the hydrocarbons are linear long chain length hydrocarbons having 39 to 60 carbon atoms;
   5 to 15% of the hydrocarbons are branched short chain length hydrocarbons having 21 to 31 carbon atoms;
   below 5% of the hydrocarbons are branched medium chain length hydrocarbons having 32 to 39 carbon atoms; and
   5 to 15% of the hydrocarbons are branched long chain length hydrocarbons having 40 to 61 carbon atoms;
   wherein the percentage in each case is relative to the total number of hydrocarbons having 15 to 110 carbon atoms.

2. The hydrocarbon wax composition according to claim 1, wherein 26 to 37% of the hydrocarbons are linear short chain length hydrocarbons having 20 to 30 carbon atoms.

3. The hydrocarbon wax composition according to claim 1, wherein 26 to 37% of the hydrocarbons are linear long chain length hydrocarbons having 39 to 60 carbon atoms.

4. The hydrocarbon wax composition according to claim 1 wherein 6 to 8% of the hydrocarbons are branched short chain length hydrocarbons having 21 to 31 carbon atoms.

5. The hydrocarbon wax composition according to claim 1, wherein 6 to 12% of the hydrocarbons are branched long chain length hydrocarbons having 40 to 61 carbon atoms.

6. The hydrocarbon wax composition according to claim 1, wherein 10 to 16% of the hydrocarbons are linear medium chain length hydrocarbons having 31 to 38 carbon atoms.

7. The hydrocarbon wax composition according to claim 1, wherein 0.1 to 3.0% of the hydrocarbons are branched medium chain length hydrocarbons having 32 to 39 carbon atoms.

8. The hydrocarbon wax composition according to claim 1, further characterized by one or more of the following definitions
   the number of ratio of linear short chain length hydrocarbons to the linear long chained hydrocarbons is between 0.5 and 1.5;
   the number ratio of branched short chain length hydrocarbons to branched long chain length hydrocarbons is between 0.5 and 1.5;
   the number ratio of linear short chain length hydrocarbons to linear medium chain length hydrocarbons is between 1.5 and 3.5;
   the number ratio of linear long chain length hydrocarbons to linear medium chain length hydrocarbons is between 2.0 and 4.0;
   the number ratio of branched short chain length hydrocarbons to branched medium chain length hydrocarbons is between 2.5 and 6.5;
   the number ratio of branched long chain length hydrocarbons to branched medium chain length hydrocarbons is between 4.0 and 7.0;
   the number ratio of linear short chain length hydrocarbons to branched short chain hydrocarbons is between 3.0 and 6.0;
   the number ratio of linear long chain length hydrocarbons to branched long chain length hydrocarbons is between 3.0 and 6.0;
   the number ratio of linear medium chain length hydrocarbons to branched medium chain length hydrocarbons is between 6.0 and 12.0.

9. The hydrocarbon wax composition according to claim 1, wherein 10 to 30% of the hydrocarbons are branched hydrocarbons.

10. The hydrocarbon wax composition according to claim 1, wherein
    at least one maximum of the linear hydrocarbon molecules is between 23 to 33 carbon atoms per hydrocarbon molecule and at least one maximum of the linear hydrocarbon molecules is between 37 to 48 carbon atoms per hydrocarbon molecule;
    at least one maximum of the branched hydrocarbon molecules is between 23 to 33 carbon atoms per hydrocarbon molecule and at least one maximum of the branched hydrocarbon molecules is between 37 to 48 carbon atoms per hydrocarbon molecule;
    the maximum with the highest number of carbon atoms per hydrocarbon molecule in the range between 23 to 33 carbon atoms per hydrocarbon molecule and the maximum with the lowest number of carbon atoms per hydrocarbon molecule in the range between 37 to 48 carbon atoms per hydrocarbon molecule of linear and branched hydrocarbon molecules differ from each other by at least by 12 carbon atoms per hydrocarbon molecule;
    the distribution has no maximum for both, the linear and the branched hydrocarbon molecules, in the above range of the at least 12 carbon atoms per hydrocarbon molecule; and
    the distribution has at least one minimum for both, the linear and the branched hydrocarbon molecules, each at 30 to 36 carbon atoms per hydrocarbon molecule; and wherein in each case the maximum is the highest number of hydrocarbon molecules within a range of +/− two carbon atom per hydrocarbon molecule and the minimum is the lowest number of hydrocarbon molecules within a range of +/− two carbon atom per hydrocarbon molecule.

11. A method for obtaining wax pastilles or a wax powder comprising the following step:
provpiding at least two hydrocarbon wax components, wherein
a first hydrocarbon wax component comprises hydrocarbons with 15 to 110 carbon atoms, wherein about 60% of the hydrocarbons are linear short chain length hydrocarbons having 20 to 30 carbon atoms; and
a second hydrocarbon wax component comprises hydrocarbons with 15 to 110 carbon atoms, wherein above 45% of the hydrocarbons are linear long chain length hydrocarbons having 39 to 60 carbon atoms;
mixing the hydrocarbon wax components in a molten state with each other to obtain the hydrocarbon wax composition according to claim 1; and
solidifying the hydrocarbon wax composition.

12. A method according to claim 11, wherein:
the second hydrocarbon wax component comprises hydrocarbons with 15 to 110 carbon atoms, wherein above 60% of the hydrocarbons are linear long chain length hydrocarbons having 39 to 60 carbon atoms.

13. Wax pastilles or a wax powder obtained by a method according to claim 11.

14. A method of producing a rubber product, comprising:
providing a hydrocarbon wax composition comprising hydrocarbons with 15 to 110 carbon atoms, wherein
25 to 40% of the hydrocarbons are linear short chain length hydrocarbons having 20 to 30 carbon atoms;
5 to 18% of the hydrocarbons are linear medium chain length hydrocarbons having 31 to 38 carbon atoms;
25 to 40% of the hydrocarbons are linear long chain length hydrocarbons having 39 to 60 carbon atoms;
5 to 15% of the hydrocarbons are branched short chain length hydrocarbons having 21 to 31 carbon atoms;
below 5% of the hydrocarbons are branched medium chain length hydrocarbons having 32 to 39 carbon atoms; and
5 to 15% of the hydrocarbons are branched long chain length hydrocarbons having 40 to 61 carbon atoms;
wherein the percentage in each case is relative to the total number of hydrocarbons having 15 to 110 carbon atoms;
mixing the hydrocarbon wax composition with a rubber composition to produce a rubber product.

15. The method of claim 14 wherein the rubber product comprises 0.5 to 10 parts per hundred rubber of the hydrocarbon wax composition.

16. The method of claim 14 wherein the hydrocarbon wax composition has one or more of the following properties:
reduces blooming of hydrocarbon wax molecules on the surface of the rubber product;
protects the rubber product against ozone depletion; and/or
protects the rubber product against ageing.

* * * * *